W. J. SANBORN.
CULTIVATOR.
APPLICATION FILED NOV. 9, 1908.

944,215.

Patented Dec. 21, 1909.

Witnesses
E. H. Stewart
O. Daniels

Inventor
Willis J. Sanborn.
By C. A. Snow & Co.
Attorneys

UNITED STATES PATENT OFFICE.

WILLIS J. SANBORN, OF PALISADES, COLORADO.

CULTIVATOR.

944,215.  Specification of Letters Patent.  Patented Dec. 21, 1909.

Application filed November 9, 1908. Serial No. 461,749.

*To all whom it may concern:*

Be it known that I, WILLIS J. SANBORN, a citizen of the United States, residing at Palisades, in the county of Mesa and State of Colorado, have invented a new and useful Cultivator, of which the following is a specification.

This invention has relation to cultivators and it consists in the novel construction and arrangement of its parts as hereinafter shown and described.

The object of the invention is to provide a cultivator which is especially adapted to be effectually used for cultivating the soil in orchards where the limbs of the trees are low and where it is necessary to cultivate the soil close to the trunks of the trees.

With this object in view the implement is so constructed and the parts thereof are so arranged that the draft animal or animals may pass along the trees while the implement is provided with a laterally disposed portion which is adapted to project under the limbs of the trees and which carries earth-engaging members in such positions that they may effectually work the soil in close proximity to the tree trunks. Means is provided for disposing the laterally disposed portion at a desired angle with relation to the draft beam of the implement, and disks are carried by the draft beam which are designed to prevent tendency of side draft when the implement is in operation; but, however, when it is desired that the implement should move laterally and promptly in order to avoid injury to the tree trunks, the said draft beam may be lifted, whereby the said disks will be raised above the ground and the laterally disposed portion of the implement will move sidewise and will miss the tree trunks.

Figure 1:
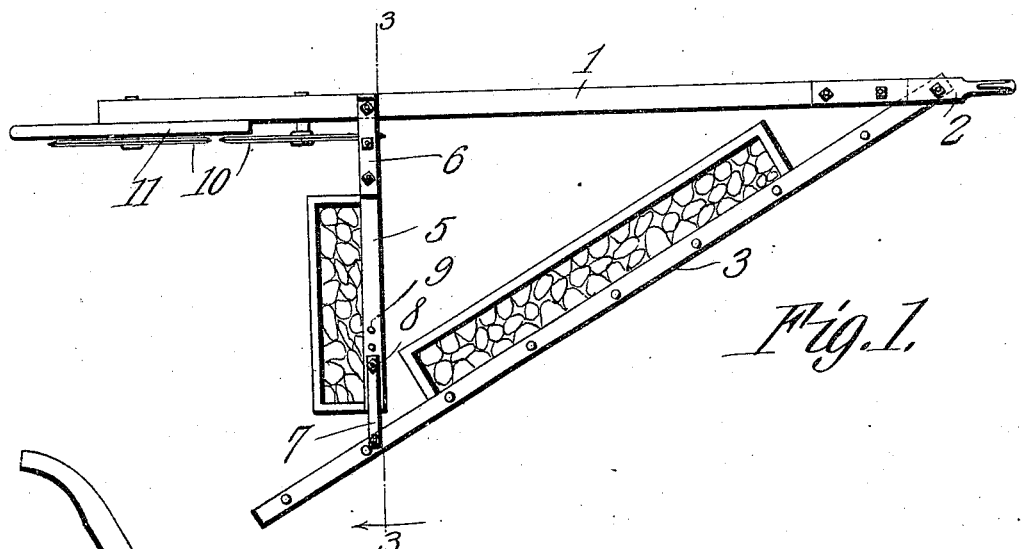
Figure 2:
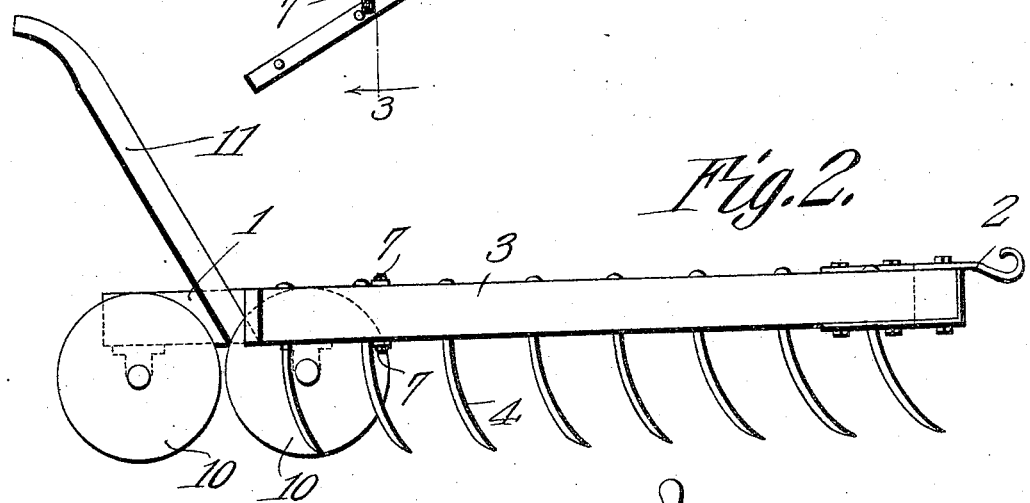
Figure 3:
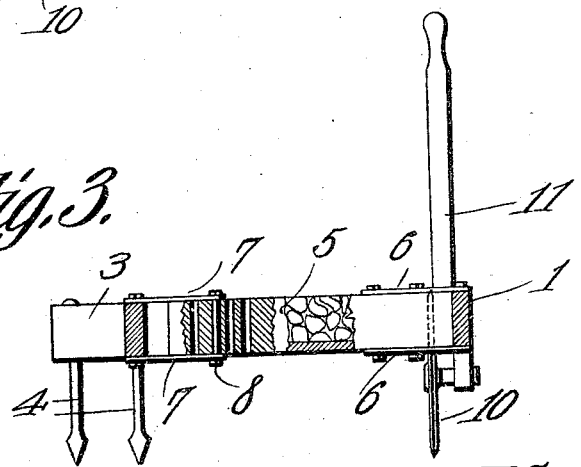

In the accompanying drawings:—Figure 1 is a top plan view of the cultivator. Fig. 2 is a side elevation of the same. Fig. 3 is a sectional view of the cultivator cut on the line 3—3 of Fig. 1.

The implement consists of the draft beam 1, to the forward end of which is attached a clevis 2. The side beam 3 is pivotally connected at its forward end with the forward end portion of the draft beam 1, and the said side beam 3 is provided with a series of harrow teeth 4, or other soil-engaging members. The cross-beam 5 is located between the rear end portions of the beams 1 and 3, and is fixed with relation to the beam 1 by means of the upper and lower strips or plates 6. The plates or strips 7 are attached at one end portion with the beam 2, and at their other end portion are attached to the intermediate portion of the beam 5 by means of the vertically disposed bolt 8 which passes through the inner end portions of the said plates or strips 7, and one of a series of perforations 9 provided in the said beam 5. By such an arrangement it is obvious that by removing the bolt 8 the rear end portion of the beam 3 may be swung laterally with relation to the beam 1, and when at a desired position may be secured in such position by inserting the bolt 8 through a registering perforation of the series 9 of the beam 5. The disks 10 are pivotally mounted at the rear end portion of the beam 1 and are adapted to rotate in the line of draft of the implement. The handle 11 is attached to the rear end portion of the draft beam 1. Thus it will be seen that an implemnt will be provided which is of such structure that the draft animal or animals connected with the clevis 2 may pass along the side of a row of trees, and that the laterally disposed beam 3 and the earth-engaging members 4 carried thereby will be projected under the limbs, and the said members may effectually operate upon the soil in close proximity to the tree trunks. As the implement is thus passing along the row of trees the disks 10 will enter the soil and prevent the implement from having a tendency to side draft. In other words, the contact between the soil and the said disks 10 will be sufficient to counteract the contact between the soil and the earth-engaging members 4, so that the beam 1 and the disks 10 will be disposed in the line of draft of the implement as an entirety.

If at any time during the operation of the implement it should be necessary or desirable to have the beam 3 moved suddenly away from the trunks of the standing trees an operator raises the handle 11, which, in turn, will lift the rear end portion of the draft beam 1, and the disks 10 will be raised above the surface of the ground; so that the frictional contact between the earth-engaging members 4 and the surface of the soil will be sufficient to cause the rear end portion of the beam 3 to move toward the line of draft of the implement; that is to say, in a lateral direction away from the tree trunks, and thus the said beam portion 3 may be quickly moved away from the trunks of the standing trees as the implement is moving in a straightforward direction, and thus reducing the possibility of injury to the trees by reason of forcing the implement in contact with the trunks thereof.

It will be noted that the diagonally disposed beam 3 constitutes deflecting means whereby, should the said beam be brought unexpectedly into contact with the trunk of a tree the entire machine will be shifted laterally without danger of snapping off the trunk of the tree. Should the disks 10 project some distance into the ground, the operator should, the instant the beam 3 comes in contact with the tree, lift upon the handle 11, so as to withdraw the disks 10 from the ground and permit the machine to be shifted freely to one side by the frictional engagement of the beam 3 with the tree trunk. However, if the disks 10 are not projecting a great distance into the ground, it will not be necessary to lift the machine as said disks will be slid laterally with the frame of the cultivator.

Having described my invention, what I claim as new, and desire to secure, by Letters Patent, is:—

A cultivator of the class described including a draft beam, a diagonally disposed deflecting beam secured at its front end to the draft beam, means for spacing the rear end of the deflecting beam from the draft beam, earth engaging members carried by the deflecting beam and a combined guide and supporting disk journaled to the draft beam and arranged to rotate in a plane in the line of draft of the implement, and a handle attached to the draft beam and adjacent the disk.

In testimony that I claim the foregoing as my own, I have hereto affixed my signature in the presence of two witnesses.

WILLIS J. SANBORN.

Witnesses:
H. L. OLIVER,
C. H. VOGEL.